United States Patent [19]

Woolley

[11] Patent Number: 5,218,832
[45] Date of Patent: Jun. 15, 1993

[54] SEPARATION METHOD AND APPARATUS FOR A LIQUID AND GAS MIXTURE

[75] Inventor: Richard P. Woolley, Boulder, Colo.
[73] Assignee: Ball Corporation, Muncie, Ind.
[21] Appl. No.: 760,776
[22] Filed: Sep. 16, 1991
[51] Int. Cl.⁵ .............................................. F25B 43/02
[52] U.S. Cl. ........................................ 62/84; 62/470; 55/235; 55/257.4; 55/257.6
[58] Field of Search ................... 62/84, 468, 470, 473; 55/159, 182, 257.4, 257.6, 399, 235

[56] References Cited

U.S. PATENT DOCUMENTS

| | | | |
|---|---|---|---|
| 3,933,448 | 1/1976 | Di Peri | 55/159 |
| 4,190,426 | 2/1980 | Ruschke | 55/185 |
| 4,472,949 | 9/1984 | Fujisawa et al. | 62/473 |
| 4,662,190 | 5/1987 | Tischer | 62/470 |
| 5,113,671 | 5/1992 | Westermeyer | 62/468 |

FOREIGN PATENT DOCUMENTS 1043437 9/1983 U.S.S.R. .................................. 62/84

Primary Examiner—Albert J. Makay
Assistant Examiner—William C. Doerrler
Attorney, Agent, or Firm—Gilbert E. Alberding

[57] ABSTRACT

Means are provided to separate liquid particles from a flowing gas and liquid particle mixture which does not require any moving parts. A housing receives the gas and liquid particle mixture and includes a porous membrane interface which separates a higher pressure area from a lower pressure area within the housing. An elongated spiral conduit forming an area of higher pressure provides a flow path from an inlet to an outlet of the housing. The liquid particles in the flowing gas and liquid particle mixture are urged by their flow through the elongated spiral conduit into contact with the porous membrane interface. The liquid particles coat the porous membrane interface and form a film created by the surface tension of the liquid. Liquid from particles which continue to come into contact with the porous membrane interface is urged through the membrane into the lower pressure area while gas is retained in the higher pressure area. The separated liquid and cleansed gas can be removed from the housing for reuse.

21 Claims, 4 Drawing Sheets

SEPARATION METHOD AND APPARATUS FOR A LIQUID AND GAS MIXTURE

FIELD OF THE INVENTION

This invention relates to a method and apparatus for separating a liquid from a gas and suspended liquid particle mixture, and more particularly relates to a method and apparatus for separating oil suspended in an oily refrigerant gas.

BACKGROUND OF THE INVENTION

It is known in the art that a liquid and gas can be separated by a separator formed from porous material having a "bubble pressure" in excess of a pressure differential across the separator. In such separators the liquid forms a film, with a rupture strength dependent on the physical properties of the liquid and the pore size of the separator, and the film cannot be broken at the operating pressure differential. The separator allows the liquid to flow from the higher pressure side to the lower pressure side while prohibiting the gas from entering the lower pressure region.

For example, U.S. Pat. No. 3,933,448 to Di Peri discloses a fuel reservoir, e.g., a fuel reservoir for aircraft, which contains fuel and undesirable gas bubbles. To ensure that only fuel exits the fuel reservoir, a liquid/gas separator comprising a mesh screen (250×1370 wires per inch) is employed at the fuel outlet. The fuel forms a film on the screen and the film allows liquid to pass through the mesh, but its surface tension prevents the passage of undesirable gas bubbles from the fuel reservoir.

U.S. Pat. No. 4,543,303 to Dantowitz et al. teaches a fuel cell battery apparatus which separates by-product water formed by the combination of hydrogen and oxygen gasses in each of the battery cells by means of a liquid/gas separator comprising porous discs of sintered niobium metal. The sintered niobium discs permit the flow of water but block the flow of gas at operating pressure because of the "bubble pressure" created by the surface tension of the water. In Dantowitz, the water is apparently urged into contact with the water/gas separator at the bottom of each battery cell by gravitational force.

U.S. Pat. No. 4,729,932 to McElroy also discloses a fuel cell battery in which water is separated from gas by a sintered metal separator, preferably sintered niobium. By inducing an approximate 3 pounds per square inch pressure differential across the water/gas separator, the liquid can readily pass through the separator while the gas remains on the high pressure side of the screen. McElroy states that such a system may ultimately be used in a zero gravity environment (apparently because of the pressure differential on opposite sides of the gas/water separator).

None of these patents, however, discloses a method and apparatus for separating liquid particles suspended in a liquid and gas mixture that is principally gas with relatively sparse liquid particles suspended within the gas.

DISCLOSURE OF THE INVENTION

This invention provides a method and apparatus for separating liquid particles from a gas and suspended liquid particle mixture which does not require any moving parts and which is operable under very low temperature and non-gravity environmental conditions.

Such apparatus comprises a housing for the gas and liquid particle mixture; a porous membrane interface which separates a higher pressure area from a lower pressure area within the housing and contains the gas and liquid particle mixture within the higher pressure area; and means for urging the liquid particles into contact with the porous membrane interface, so that the porous membrane interface becomes coated with liquid of the liquid particles to form a film having surface tension which prevents the passage of gas from the higher pressure area to the lower pressure area.

Such apparatus can provide a scavenger for removing liquid particles from a flowing gas in the absence of gravity. A gas conduit is formed in the scavenger, having as one wall portion the porous membrane interface. The gas conduit can bend from a straight path and impose the porous membrane wall portion in the path of liquid particles carried by the flowing gas so that the momentum of the liquid particles carries them into contact with the porous membrane wall portion. The scavenger also forms a liquid conduit adjacent the opposite side of said porous membrane wall portion of said gas conduit to remove the liquid of the liquid particles.

A preferred application for such an apparatus is in a refrigeration system including a mechanical compressor which is lubricated by liquid lubricant particles carried by the flow of a refrigerant gas. The compressor compresses and causes a flow of a refrigerant gas under pressure.

In a preferred scavenger apparatus for such a refrigeration system, the porous membrane interface forms a long cylinder, and the gas conduit is in the form of an elongated spiral conduit opening outwardly between its entrance and exit ends and located within the cylindrical porous membrane interface so that centrifugal forces acting on the liquid lubricant particles carried in the spiral conduit by the refrigerant gas urges the particles to impact the porous membrane interface. The housing comprises an outer housing portion forming, as the liquid side, a cylindrical cavity around the cylindrical porous membrane, and a central cylindrical member fitting within said cylindrical porous membrane with the outwardly open spiral conduit formed in its outer cylindrical surface.

In the preferred method of the invention, the gas and liquid particle mixture flows in an elongated spiral conduit formed in part by a porous membrane interface. The liquid particles in the flowing gas and suspended liquid particle mixture are urged into contact with the porous membrane interface, to coat and form a film over the porous membrane interface having a bubble pressure dependant on the surface tension of the liquid and the pore size of the membrane. Liquid particles are continually supplied to and urged into contact with the porous membrane interface after the film is formed and the liquid of such particles passes through the membrane into a lower pressure area while gas is retained in the higher pressure area formed by the elongated spiral conduit. The separated liquid and gas can then be reused.

BEST MODE FOR CARRYING OUT THE INVENTION

Figure 1:
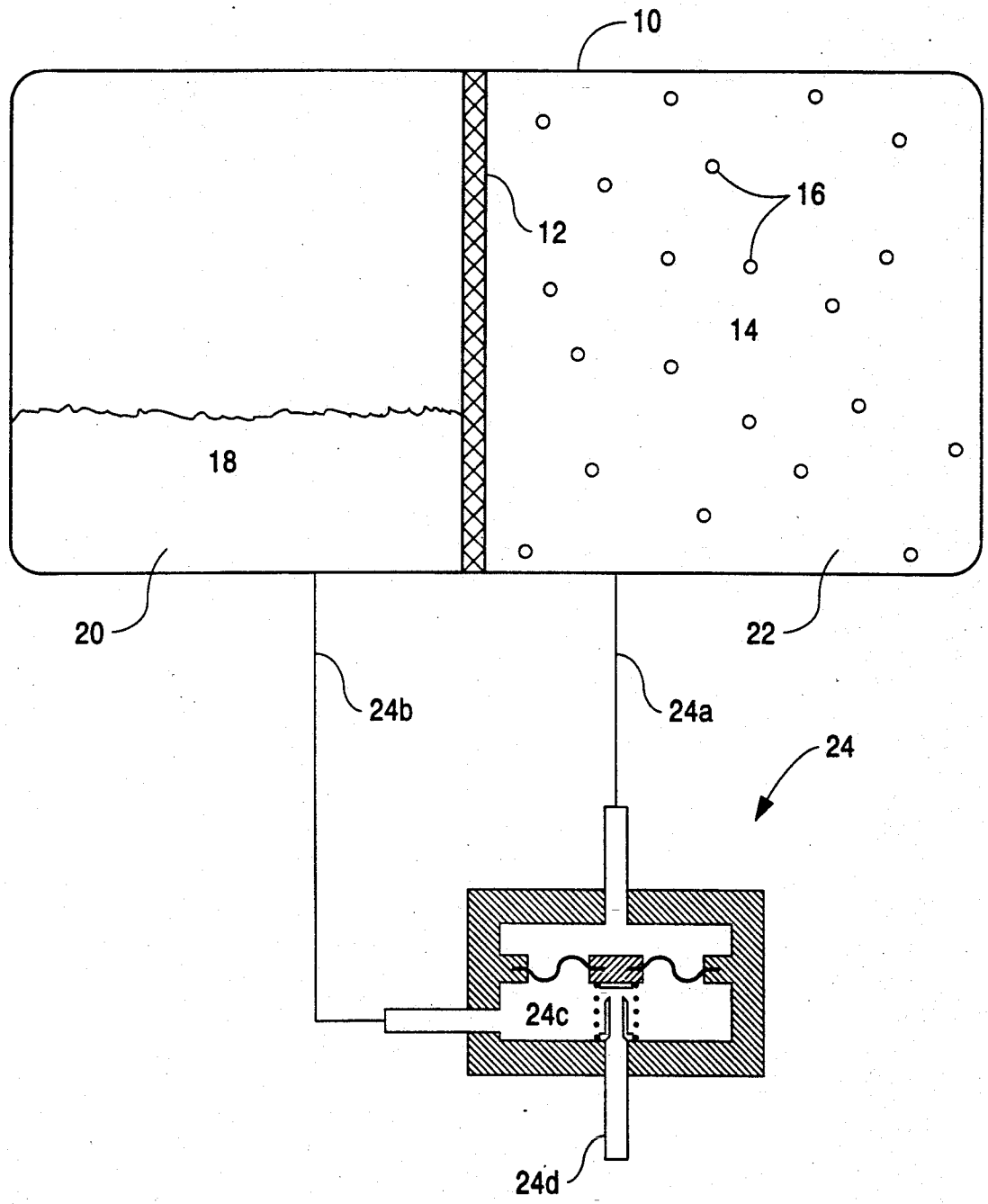
FIG. 1 generally illustrates the prior art.

FIG. 1 illustrates a prior art device, such as shown in U.S. Pat. No. 3,933,448 to Di Peri, to explain "bubble pressure". A container 10 includes a liquid/gas separator 12 which separates liquid 18 from a liquid and gas mixture 14 having suspended gas bubbles 16. A pressure regulating means 24 is provided for maintaining a predetermined pressure differential across the liquid/gas separator 12

The liquid in the liquid and gas mixture 14 forms a film, closing the small pores of the liquid/gas separator 12 and creates a "bubble pressure" dependent on the surface tension of the liquid and pore size of the liquid/gas separator 12. Liquid can freely pass through the liquid/gas separator 12 but gas bubbles are blocked by separator 12. If the pressure differential across the separator 12 exceeds a certain value, the surface tension of the film will be overcome and gas bubbles on the higher pressure side can flow through separator 12 to the lower pressure side. Thus, "bubble pressure" means a maximum pressure differential across a liquid/gas separator, above which the liquid film covering the liquid/gas separator is broken and gas is allowed to pass through to a lower pressure side.

The separated liquid 18 flows from container 10 via a conduit 24b to a liquid receiving chamber 24c of the pressure regulating means 24. From the liquid receiving chamber 24c, the separated liquid can flow through the outlet 24d for collection or disposal. Although separators of the type shown in FIG. 1 work well for separating gas and liquid from a gas and liquid mixture, they will not operate where the mixture is comprised principally of gas with liquid particles sparsely distributed and suspended therein. When a film is formed on the liquid/gas separator 12, two separate environments having separate static pressures are created on each side of the separator 12 and the sparsely distributed liquid particles are not urged into contact with the liquid/gas separator.

Figure 2:
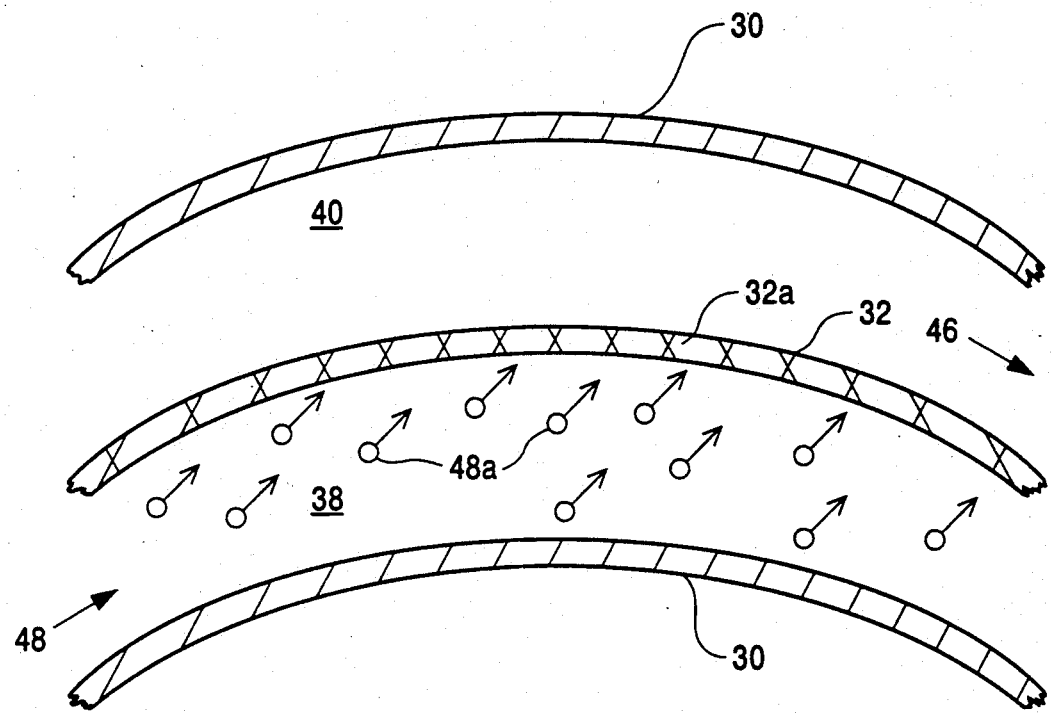
FIG. 2 is a simple illustration of a separator of the invention.

FIG. 2 shows a simple illustration of the separator of the invention. As shown, a housing 30 includes a porous membrane interface 32 that separates a lower pressure area 40 from a higher pressure area 38 within the housing 30. The liquid and gas mixture 48 shown in FIG. 2 is comprised of primarily gas with a sparse distribution of suspended liquid particles 48a. The liquid in the liquid and gas mixture 48 has filled the small pores 32a of the porous membrane interface 32, thereby forming a film and preventing gas in the liquid and gas mixture 48 from passing through to the lower pressure area 40. Liquid from the liquid particles 48a that come in contact with the porous membrane interface 32 after formation of the liquid film will pass through from the higher pressure area 38 to the lower pressure area 40.

The suspended liquid particles 48a can be urged into contact with the porous membrane interface 32 by various means and methods. As illustrated in FIG. 2, the momentum of the particles 48a, or the centrifugal force acting upon flowing liquid particles 48a urges the particles to contact the porous membrane interface 32. Such force can be imposed on liquid particles 48a in a flowing gas and liquid particle mixture 48 by forcing the flowing gas and liquid particle mixture through a bending path, as shown in FIG. 2, with the porous membrane interface 32 providing a surface requiring the gas and liquid particle mixture to flow through a bending path. Other flow paths for causing the liquid particles 48a to contact the porous membrane interface 32 by changing flow directions and using the momentum of the moving liquid particles are also within the scope of this invention.

Figure 3:
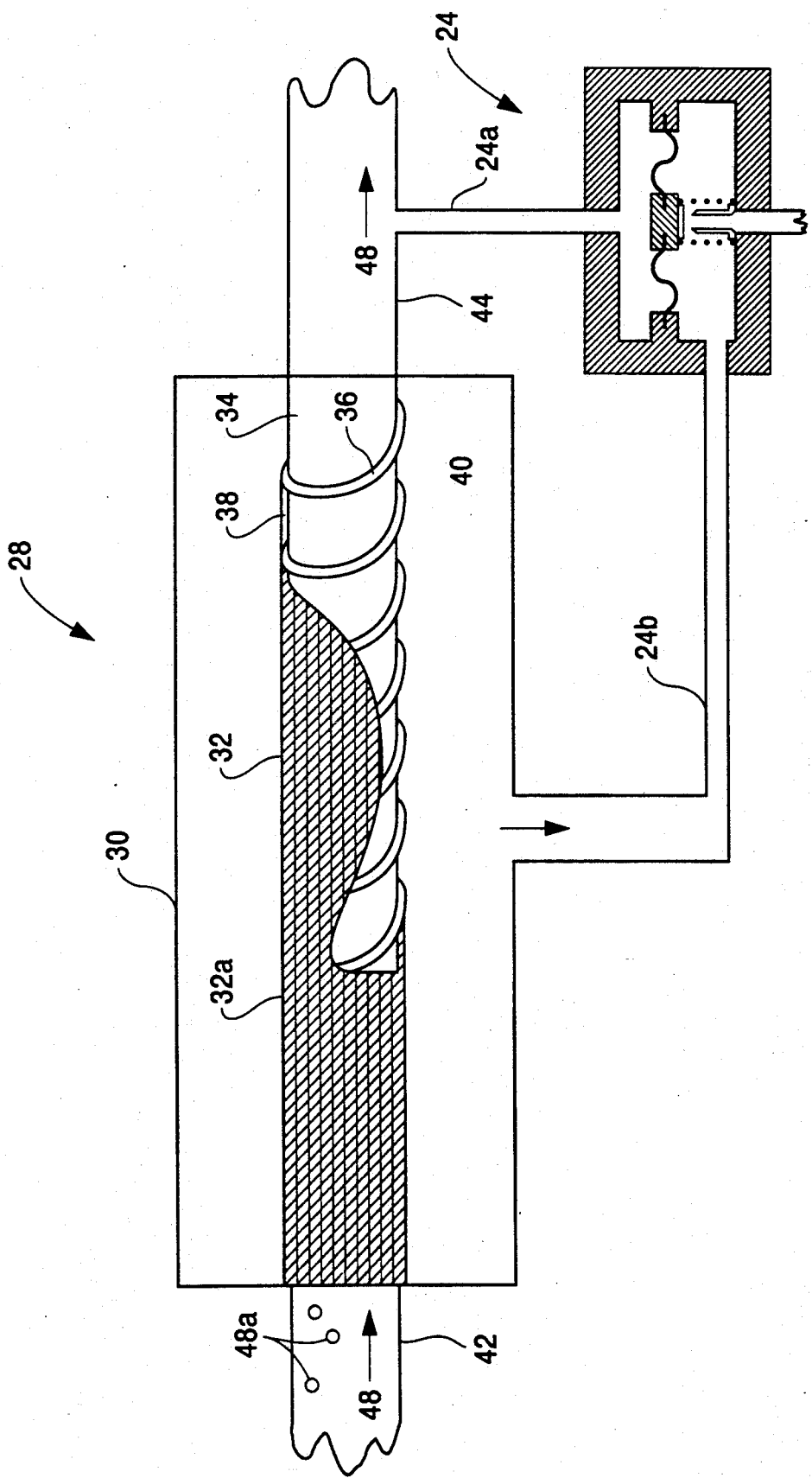
FIG. 3 shows an exemplary embodiment of the invention.

FIG. 3 diagrammatically shows an embodiment 28 of my invention which ensures contact of substantially all suspended liquid particles in a liquid and gas mixture comprising principally gas with sparsely distributed liquid particles. A housing 30 receives a gas and suspended liquid particle mixture at inlet 42. The porous membrane interface 32, shown in partial cut-away in FIG. 3, includes small pores 32a and surrounds a cylindrical shaft 34. Between the shaft 34 and the porous membrane interface 32 is a spiral member 36 which extends from at or near the inlet 42 to at or near the outlet 44. The porous membrane interface 32, shaft 34 and spiral member 36 form an elongated spiral conduit 38, which is maintained at a higher pressure 38 and is separated by the porous membrane interface 32 from a lower pressure area 40. A liquid outlet 46 allows removal of the separated liquid from lower pressure area 40.

For convenience, the volume, or area of higher pressure, for example, as formed by elongated spiral conduit 38 of FIG. 3, containing a mixture of gas with suspended liquid particles will also be referred to as the gas side of the porous membrane interface and the volume or area of lower pressure, for example, the portion 40 containing separated liquid, will also be referred to as the liquid side of the porous membrane interface.

As shown in FIG. 3, the gas and suspended liquid particle mixture 48 enters the inlet 42. The liquid and gas mixture 48 is caused to flow in the elongated spiral conduit 38 extending from the inlet 42 to the outlet 44. Because of the spiral motion of the flow path, centrifugal force is exerted on the liquid particles 48a which are thereby caused to move toward the porous membrane interface 32. Initially, the pores 32a of the porous membrane interface 32 are not covered by liquid particles, and gas can pass through the porous membrane interface 32. However, as liquid particles come into contact with the porous membrane interface 32, the pores 32a are closed by the liquid via its surface tension. The entire porous membrane interface 32 becomes covered by a liquid film and a distinct higher pressure area is maintained within elongated spiral conduit 38. Alternatively, a liquid, or a liquid-gas mixture comprising all or substantially all liquid, could be initially introduced at inlet 42 to ensure rapid formation of a film on the porous membrane interface 32.

As is known in the art, the liquid forming the film which covers the porous membrane interface 32 will allow liquid from the particles to pass freely through the porous membrane interface 32, but its surface tension prevents the gas from doing so. The surface tension of the liquid creates a "bubble pressure" dependent upon the physical properties of the liquid and the pore size 32a of the porous membrane interface 32. If the pressure in the higher pressure area formed by elongated spiral conduit 38 exceeds the pressure in the lower pressure area 40 by more than the bubble pressure, the liquid film covering porous membrane interface 32 will be broken and gas can pass through the porous membrane interface 32 into the lower pressure area 40. The pressure differential across the porous membrane interface 32 can be regulated by a back pressure regulator 50. Such a regulator is not, however, necessary to the invention.

As the liquid and gas mixture flows through the elongated spiral conduit 38 from the inlet 42 to the outlet 44, the centrifugal force continually causes the liquid particles to move outward toward the porous membrane interface 32. At outlet 44, the mixture 48 comprises all or substantially all gas with little or no suspended liquid particles. The separated liquid within the lower pressure area 40 can be removed by gravitational force from liquid outlet 46 or by providing an additional pressure differential at liquid outlet 46.

In a preferred embodiment of my invention, the porous membrane interface 32 is a stainless steel screen with a Dutch twill weave at 450 by 2750 wires per inch used for separating suspended liquid particles of one of several lubricating oil compounds. With such a combination, the bubble pressure is about 1.6 p.s.i.

Figure 4:
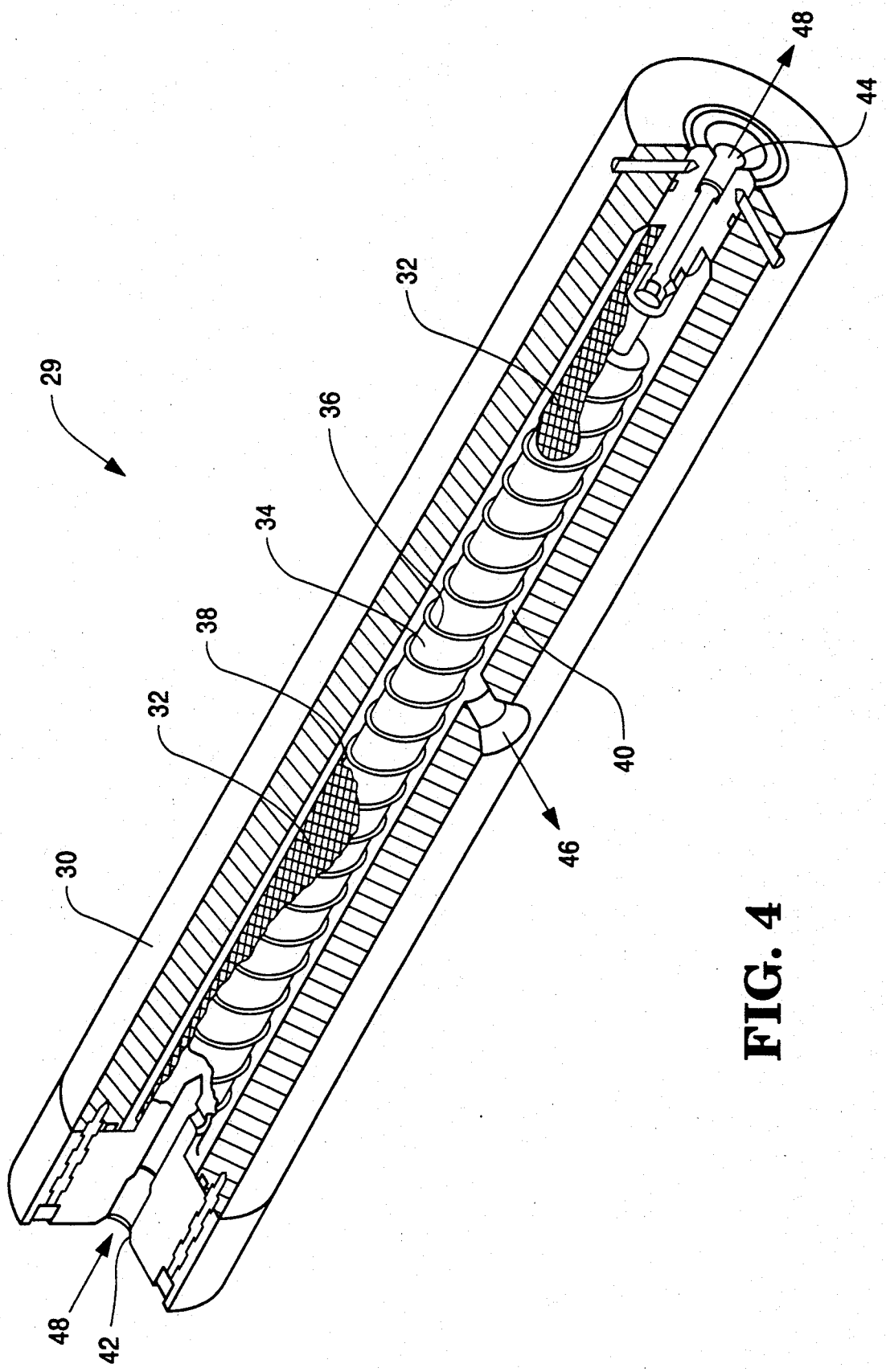
FIG. 4 illustrates the best mode for carrying out the invention as applied to a refrigeration system for use aboard spacecraft in a zero gravity environment.

FIG. 4 shows in greater detail a currently known best mode for carrying out the invention. The separation apparatus comprises an oil scavenger and is used as part of a refrigeration system which can be employed aboard a spacecraft for use in a zero gravity environment. Such a refrigeration system might be used, for example, to cool electrical equipment or components down to or near a temperature of absolute zero. The liquid and gas mixture comprises refrigerant with suspended oil particles. The oil particles are used to lubricate the compressor of the refrigeration system and must be removed from the refrigerant gas before the gas enters the expansion orifice of the refrigerator.

In such a preferred application of the invention, the oily gas exiting a refrigeration compressor, not shown, is introduced at the inlet 42 at a pressure of about 800 p.s.i. and flows in an elongated spiral conduit 38 formed by stainless steel screen 32, shaft 34, and spiral member 36. Housing 30 has thick walls to withstand the high internal pressures. As the oily refrigerant gas flows through the elongated spiral conduit 38, oil particles are forced against the stainless steel screen 32 by centrifugal force and form a liquid film over the pores of the screen 32. Suitable means are provided, such as a pressure regulator (FIG. 3) to maintain a pressure differential of about 0.9 p.s.i. between the higher pressure area within elongated spiral conduit 38 and a lower pressure area 40.

As the oily gas flows through the elongated spiral conduit 38, centrifugal force causes the suspended liquid particles to move radially outward and come in contact with the oil film on stainless steel screen 32. The 0.9 p.s.i. pressure differential causes excess oil from the oil droplets or particles to move through the screen 32 and into the lower pressure area 40. The liquid film on screen 32 is not broken by the low pressure differential and prevents refrigerant gas from flowing into the lower pressure area 40. The separated oil can be removed from the lower pressure area 40 for recycling and lubrication of the refrigeration compressor.

At outlet 44, refrigerant gas 48 exits the scavenger 28 with little or no oil suspended therein. The refrigerant gas 48 can be further purified by a small absorber, not shown, before further use in the refrigeration system.

In the absence of my invention, large absorbers must be provided to remove oil particles and purify the recycled gas. It is estimated that without the use of my invention, absorbers would be required in a spacecraft refrigeration system such as described above to collect about 3000 gallons of oil over a time period of ten years. On the other hand, with my invention, absorbers would only collect about one cup of oil over the same ten year period. My invention thus allows a substantial reduction in size of such a refrigeration system by substantially reducing the required capacity of absorbers. Such a size reduction can be especially important where overall system weight is critical, such as a refrigeration unit used aboard spacecraft.

While the preceding description illustrates the presently known best mode for carrying out the invention, the scope of this invention is not limited, as will be apparent to those skilled in the art, to the described best mode and is limited only by the scope of the invention, following claims and the prior art.

What is claimed is:

1. In a refrigeration system including a mechanical compressor for compressing and causing a flow of a refrigerant gas under pressure in the absence of gravity, said compressor being lubricated by liquid lubricant particles carried by the flow of said refrigerant gas, the improvement comprising means for separating said liquid lubricant particles from said refrigerant gas, including a housing having a liquid side and a gas side at a higher pressure than said liquid side and separated therefrom by a porous membrane interface, said porous membrane interface being located so that the flow of refrigerant gas forces said liquid lubricant particles to contact said porous membrane interface and form a film thereon between said higher pressure gas side and said liquid side, and a pressure regulator for controlling pressure differential between said higher pressure gas side and said liquid side.

2. The refrigeration system of claim 1 wherein said porous membrane interface is a long cylinder and said gas side of said housing includes an elongated spiral conduit opening outwardly between its entrance and exit ends and located within said cylindrical porous membrane interface so that centrifugal forces acting on said liquid lubricant particles carried by said refrigerant gas urges the liquid particles to impact said porous membrane interface.

3. The refrigeration system of claim 2 wherein said housing comprises an outer housing portion forming, as the liquid side, a cylindrical cavity around said cylindrical porous membrane, and a central cylindrical member fitting within said cylindrical porous membrane and adapted to form said outwardly open spiral conduit formed with its outer cylindrical surface.

4. The refrigeration system of claim 1 wherein said porous membrane interface is a stainless steel wire screen forming small openings and wherein the contact of said liquid lubricant particles closes the small openings and helps maintain the gas side at higher pressure than the liquid side.

5. The refrigeration system of claim 1 wherein said porous membrane interface is a stainless steel screen formed with a Dutch twill weave at 450×2750 wires per inch and said pressure regulator maintains a pressure differential of about 1.0 pound per square inch.

6. A scavenger for removing liquid particles from a flowing gas in the absence of gravity, comprising a housing forming a gas conduit for the flowing gas and having as one wall portion of said conduit a porous membrane interface, said gas conduit bending from a straight path and imposing said porous membrane wall portion in the path of liquid particles carried by said flowing gas so that the momentum of the liquid particles carries them into contact with said porous membrane wall portion, said housing also forming a liquid conduit adjacent the opposite side of said porous membrane wall portion of said gas conduit to remove the liquid of said liquid particles, and further comprising a differential pressure regulator for controlling pressure differential across said porous membrane between said gas and liquid conduits.

7. The scavenger of claim 6 wherein said porous membrane interface is formed by a long cylinder of porous material and said gas conduit is in the form of an elongated spiral conduit opening outwardly between its entrance and exit ends and located within said cylinder of porous material so that centrifugal forces acting on said liquid particles carried by said gas urges them to contact said porous membrane interface.

8. The scavenger of claim 6 wherein said housing is formed by an outer housing portion forming said liquid conduit as a cylindrical cavity around said cylinder of porous material, and a central cylindrical member fitting within said cylinder of porous material and forming said outwardly open spiral conduit with its outer cylindrical surface.

9. The scavenger of claim 6 wherein said porous membrane interface is a wire screen forming small openings and the contact of said liquid particles closes the small openings and maintains the gas conduit at a higher pressure than the liquid conduit.

10. The scavenger of claim 9 wherein said porous membrane interface is a stainless steel screen formed with a Dutch twill weave at 450×2750 wires per inch.

11. A method of separating lubricant particles carried by a flow of gaseous refrigerant, comprising:
    introducing the flow of gaseous refrigerant and lubricant particles at high pressure into a separator having a gas side and a liquid side;
    forcing the flow of gaseous refrigerant and lubricant particles into a path in sad gas side having a plurality of direction changes;
    providing at the plurality of direction changes a porous membrane to intercept lubricant particles carried by the flow of gaseous refrigerant; and
    controlling the pressure across the porous membrane to maintain a slight pressure differential between said gas side and said liquid side of said separator to provide a flow of lubricant from said gas side to said liquid side of said separator.

12. An apparatus for separating liquid particles from a gas and liquid particle mixture in a zero-gravity environment, comprising:
    a housing for said gas and liquid particle mixture;
    a porous membrane interface which separates a higher pressure area from a lower pressure area within said housing and which contains said gas and liquid particle mixture within said high pressure area, said porous membrane interface comprising a stainless steel wire screen formed with a Dutch twill weave; and
    means for centrifugally urging said liquid particles into contact with said porous membrane interface within said higher pressure area,
    means for centrifugally urging said liquid particles into contact with said porous membrane interface within said higher pressure area,
    said porous membrane interface becoming coated with liquid of said liquid particles to form a film thereon having surface tension which allows the passage of liquid therethrough to said lower pressure area, but prevents the passage of gas therethrough.

13. The apparatus of claim 12 wherein said means for centrifugally urging said liquid particles into contact with said porous membrane within said higher pressure area comprises an elongated spiral conduit within said porous membrane interface and means for causing said gas and liquid particle mixture to flow through said elongated spiral conduit.

14. The apparatus of claim 12 wherein said apparatus includes a pressure regulator for maintaining a pressure differential between said higher pressure area and said lower pressure area of about 1.0 pound per square inch.

15. The apparatus of claim 12 wherein said stainless steel screen provides an adequate bubble pressure at the pressure differential between the higher pressure area and lower pressure area.

16. The apparatus of claim 15 wherein said stainless steel screen is formed with a Dutch twill weave at 450×2750 wires per inch.

17. The apparatus of claim 15 wherein said stainless steel screen is formed in a small diameter tube and said means for causing liquid particles to contact said porous membrane by application of centrifugal force comprises an elongated spiral conduit circling within said small diameter tube.

18. The apparatus of claim 12 including further means to recover the liquid which passes through said porous membrane interface and into said lower pressure area.

19. The apparatus of claim 12 wherein said apparatus is included in a refrigeration system operated in a zero gravity environment.

20. An apparatus for separating suspended liquid particles from a flowing gas and liquid particle mixture, comprising:
    a housing for said flowing gas and liquid mixture;
    a porous membrane interface which separates a higher pressure area from a lower pressure area within said housing; and
    an elongated spiral conduit formed in part by said porous membrane interface and comprising said higher pressure area through which said gas and liquid particle mixture is urged to flow, said porous membrane interface comprising a stainless steel screen forming a part of said elongated spiral conduit and having a small mesh weave having 450 by 2750 wires per inch allowing formation of a liquid film thereon from said liquid particles and providing a bubble pressure greater than the operating pressure differential between the higher pressure area and lower pressure area and sufficient to prevent the passage of said gas through said liquid film from said higher pressure area to said lower pressure area.

21. A method for separating liquid particles from a gas and liquid particle mixture in a zero-gravity environment, comprising the steps of:
    providing a housing having a higher pressure area and a lower pressure area with a porous membrane interface therebetween, said porous membrane comprising a stainless steel screen mesh having a fine twill weave at 450×2750 wires per inch;
    causing said gas and liquid particle mixture to flow into said higher pressure area; and
    causing the liquid particles within said gas and liquid particle mixture to come in contact with said porous membrane interface and the liquid therefrom to flow through said porous membrane interface into said lower pressure area by the application of centrifugal force to said liquid particles within said higher pressure area.

* * * * *